United States Patent
Wallman et al.

(10) Patent No.: US 7,416,241 B2
(45) Date of Patent: Aug. 26, 2008

(54) GRILLE AND BONNET ASSEMBLY FOR A VEHICLE

(75) Inventors: Mattias Wallman, Varberg (SE); Lennart Olsson, Lerum (SE); Anders Fredriksson, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 25 days.

(21) Appl. No.: 11/731,957

(22) Filed: Apr. 2, 2007

(65) Prior Publication Data
US 2007/0236047 A1 Oct. 11, 2007

(30) Foreign Application Priority Data
Apr. 4, 2006 (EP) .................................. 06112204

(51) Int. Cl.
*B60R 21/34* (2006.01)
*B62D 25/10* (2006.01)

(52) U.S. Cl. .............................. 296/187.03; 296/187.04; 296/187.09; 296/193.09; 296/193.1; 296/193.11; 180/69.2

(58) Field of Classification Search ............ 296/187.03, 296/187.04, 187.09, 193.09, 193.1, 193.11, 296/203.02; 180/69.2; 293/115
See application file for complete search history.

(56) References Cited

U.S. PATENT DOCUMENTS

| 4,249,632 | A | * | 2/1981 | Lucchini et al. ............. 180/274 |
| 4,359,120 | A | * | 11/1982 | Schmidt et al. ........ 296/187.04 |
| 5,385,212 | A | | 1/1995 | Cady |
| 6,824,202 | B2 | * | 11/2004 | Vismara et al. ........ 296/193.11 |
| 7,004,532 | B2 | * | 2/2006 | Cartella .................. 296/187.04 |
| 7,104,350 | B2 | * | 9/2006 | Brown et al. ................ 180/69.2 |
| 7,232,178 | B2 | * | 6/2007 | Neal et al. ............. 296/187.04 |
| 2007/0284915 | A1 | * | 12/2007 | Hasegawa et al. ...... 296/187.04 |

* cited by examiner

Primary Examiner—D. Glenn Dayoan
Assistant Examiner—Greg Blankenship
(74) Attorney, Agent, or Firm—Greg Brown, Esq.; Miller Law Group, PLLC

(57) ABSTRACT

A grille and bonnet assembly is mounted at the forward end of an automotive vehicle. The bonnet is formed with a leading edge and a trailing edge with the leading edge positioned above or at an upper edge of the grille during normal operation of the automotive vehicle when the bonnet is closed. The grille and bonnet are designed with corresponding inclined surfaces that are located relative to each other such that a force greater than a predetermined value transmitted from the bonnet to the grille forces at least the upper part of the grille to move forwardly so as to allow the bonnet to move downwardly. Such yielding movement of the grille and bonnet can reduce injuries in the event of an impact between a pedestrian and the bonnet of the automotive vehicle.

20 Claims, 3 Drawing Sheets

GRILLE AND BONNET ASSEMBLY FOR A VEHICLE

FIELD OF THE INVENTION

The invention relates to a grille and bonnet assembly for an automotive vehicle, and, more particularly, to a mounting mechanism that moves the grille forwardly to allow the bonnet to move downwardly when incurring an impact.

BACKGROUND OF THE INVENTION

Motor vehicle manufacturers are constantly striving to provide vehicles which, in the event of a collision, reduce the risk of injury to persons involved in the collision. These persons may be occupants of the vehicle or a pedestrian which is struck by the vehicle. To this end, vehicles are nowadays designed with so-called deformation zones which deform in a controlled manner to thereby absorb energy which arises during impact between the vehicle and an object. The amount of energy which arises in a collision is proportional to the square of the relative velocity between the vehicle and the object at impact. Accordingly, the risk of injury to occupants of vehicles is increased at higher speeds. Due to the considerable amounts of energy which arise as a result of high speed collisions, the deformation zones must exhibit a certain degree of stiffness, or resistance to deformation, to function effectively at those high speeds.

Most collisions between vehicles and pedestrians occur in built-up or urban areas in which the speed of the vehicles is relatively low. For example, most jurisdictions impose a speed limit in urban areas of about 50 km/h. In most collisions, the speed of the vehicle is lower than 40 km/h. Due to the relatively light weight of most pedestrians, the amount of energy arising from a low speed collision between a vehicle and a pedestrian is relatively low. In such situations, the deformation zones of the vehicle may not deform to any great extent and, therefore, a large amount of the energy is transmitted to the pedestrian, possibly resulting in injury.

In addition, a vehicle has certain critical positions that are involved during a collision between a pedestrian and a vehicle. During such a collision between a vehicle and a pedestrian, the pedestrian typically initially impacts the front of the vehicle and, thereafter, the bonnet of the vehicle. Although the bonnet itself may be designed to be relatively deformable, the engine covered by the bonnet is normally not deformable. As a result, the deformation capability of the bonnet is dependent on the size of the clearance between the bonnet and the engine. Several attempts have been made to reduce the head injuries of a pedestrian by certain configurations of the vehicle bonnet, including different configuration that cause the trailing edge of the bonnet to lift. For example, U.S. Pat. No. 5,385,212, granted on Jan. 31, 1995, to John Cady, et al., discloses a vehicle bonnet for motor cars where the vehicle bonnet is lifted to provide a clearance, so that the bonnet may deform to cushion the impact. Such a clearance can be obtained by arranging the bonnet assembly to move rearwardly and pivot when an impact is applied to the leading edge of the bonnet. Such a bonnet is, however, not able to effectively protect a pedestrian in all kind of impact situations. In particular, in a collision between a child and a vehicle the head of the child hits the bonnet at a position much closer to the leading edge of the bonnet.

SUMMARY OF THE INVENTION

A vehicle is usually provided with a grille and a bonnet which are arranged adjacent to each other during normal operation when the bonnet is closed. The leading edge of the bonnet is usually arranged above or on the upper edge of the grille. During an impact where a pedestrian for instance hits the bonnet, the grille counteracts vertical movement of the bonnet since the grille normally has a relatively high resistance to deformation when being loaded in the vertical direction. This implies that the deformation capability of the bonnet is strongly reduced in the area close to the grille. In most cases the mass-moment of inertia of the bonnet, and the force exerted by any other component supporting the bonnet, creates a sufficient resistance against movement of the bonnet to cushion the impact. Any additional resistance against movement or resistance to deformation caused by a grille could increase the risk of injury to the pedestrian.

The invention is based on the insight that the bonnet area close to a grille is potentially dangerous to a pedestrian being hit by a vehicle, in particular to a child since the head of the child can impact the region of the bonnet where the upper edge of the grille interacts with the bonnet during an impact.

It is an object of this invention to provide a grille and bonnet assembly for a vehicle of the kind referred to in the introduction, by which grille and bonnet assembly the risk of injury to a pedestrian during an impact between the pedestrian and a vehicle is reduced to a substantial extent.

It is a feature of this invention that the grille is mounted to move forwardly to allow the bonnet to move downwardly in the event of an impact.

It is another feature of this invention that the grille and the bonnet leading edge are formed with corresponding inclined engagement surfaces arranged so that a downward displacement of the bonnet causes the grille to be pushed forwardly.

By the provision of a grille and bonnet assembly where the grille portion and the bonnet portion are designed and located relative to each other such that above a predetermined value representative of a force to be transmitted from the bonnet portion to the grille portion, the bonnet portion is arranged to force at least the upper part of the grille portion to move forwardly, the bonnet portion can move downwardly during an impact while the resistance against movement caused by the grille is reduced or substantially eliminated.

It is an advantage of this invention that the grille and bonnet assembly according to the instant invention can be used for achieving a pedestrian protection in an accident between a vehicle and a pedestrian. In particular, possibly head injuries of a child caused by a collision can be reduced.

According to a preferred embodiment of the invention, the leading edge of the bonnet portion has a surface directed downwardly and forwardly, and the upper edge of the grille portion has a surface directed upwardly and rearwardly, and the surface of the leading edge of the bonnet portion and the surface of the upper edge of the grille portion form an angled interface and are arranged to slide relative to each other during impact. Hereby, a force can be transferred from the bonnet portion to the grille portion so as to displace the grille portion in the forward direction while the grille and bonnet assembly can be produced in a cost effective way without any additional component.

It is yet another object of this invention to provide a grille and bonnet assembly for an automotive vehicle that is arranged to yield during impact to allow the downward movement of the bonnet, and which is durable in construction, inexpensive of manufacture, carefree of maintenance, facile in assemblage, and simple and effective in use.

These and other objects, features and advantages are accomplished according to the instant invention by providing a grille and bonnet assembly is mounted at the forward end of an automotive vehicle. The bonnet is formed with a leading edge and a trailing edge with the leading edge positioned above or at an upper edge of the grille during normal operation of the automotive vehicle when the bonnet is closed. The grille and bonnet are designed with corresponding inclined surfaces that are located relative to each other such that a force greater than a predetermined value transmitted from the bonnet to the grille forces at least the upper part of the grille to move forwardly so as to allow the bonnet to move downwardly. Such yielding movement of the grille and bonnet can reduce injuries in the event of an impact between a pedestrian and the bonnet of the automotive vehicle.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
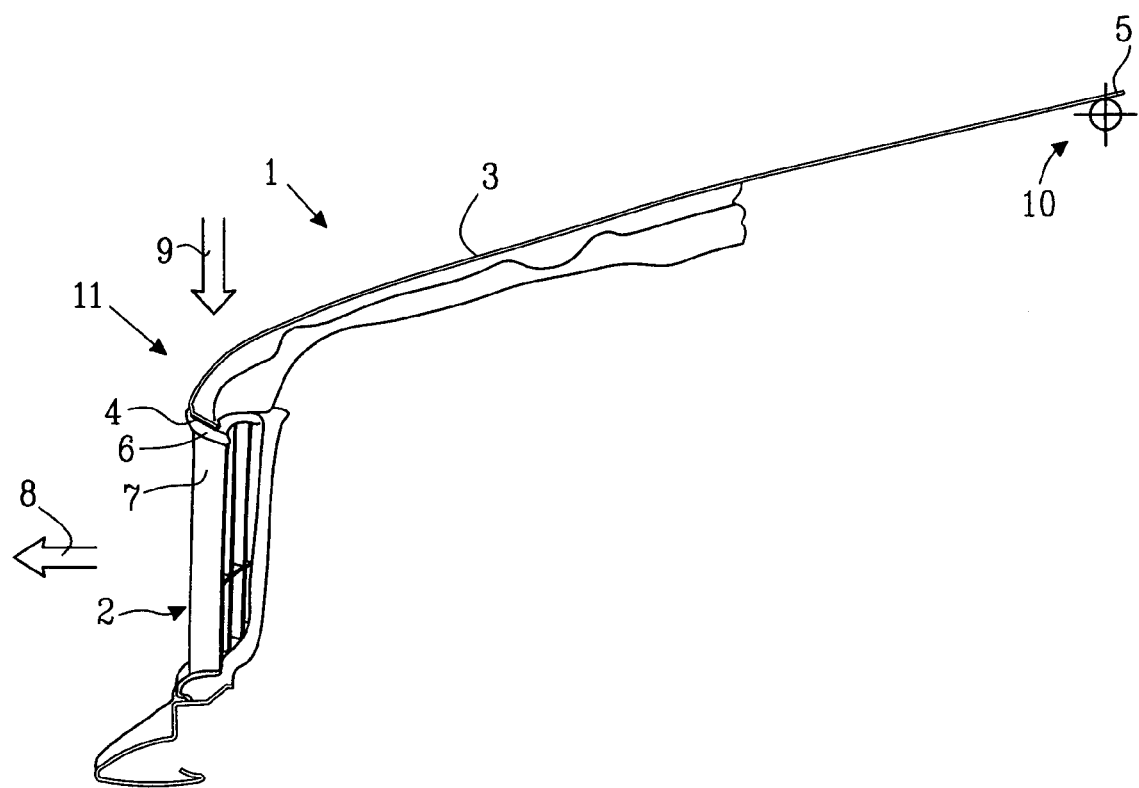
FIG. 1 is a schematic cross-sectional view showing a grille and bonnet assembly for an automotive vehicle incorporating the principles of the instant invention.

Referring now to FIGS. 1-3c, a grille and bonnet assembly 1 for an automotive vehicle incorporating the principles of the instant invention can best be seen. The grille and bonnet assembly 1 for a vehicle comprises a grille portion 2 and a bonnet portion 3. The bonnet portion 3 has a leading edge 4 and a trailing edge 5 and the leading edge 4 is arranged above or on an upper edge 6 of the grille portion 2 during normal operation when the bonnet is closed. As best seen in FIGS. 2a and 2b, the leading edge 4 of the bonnet portion and the upper edge 6 of the grille portion 2 at least partly overlap each other when viewed in a vertical direction.

The grille portion 2 and the bonnet portion 3 are designed and located relative to each other such that above a predetermined value representative of a force to be transmitted from the bonnet portion 3 to the grille portion 2, the bonnet portion 3 is arranged to force at least the upper part 7 of the grille portion 2 to move forwardly 8 so as to allow the bonnet portion 3 to move downwardly 9 in case of an impact between an object, such as a pedestrian, and the bonnet portion 3. The expressions "forwardly" and "downwardly" are used to describe the grille and bonnet assembly and the function thereof when the assembly is mounted in the intended position and orientation on a vehicle as illustrated in FIG. 1. By using a conversion factor, the energy transferred between the bonnet portion 3 and the grille portion 2 can be expressed as a force exerted on the grille portion 2, and vice versa.

By the expression "to move forwardly 8" is meant a substantially horizontal movement in the direction from a trailing end 10 towards a leading end 11 of the bonnet portion 3, or in other words, in the normal forward direction 8 of a vehicle during driving thereof. Correspondingly, by the expression "to move downwardly 9" is meant a substantially vertical movement towards the ground and perpendicularly to the forward direction 8.

The "grille portion 2" can be a single grille component or a front fascia component which at least partly surrounds a grille component, or a combination of such a grille component and such a front fascia component. This implies that the bonnet 3 can transmit energy either directly to a grill component or to a front fascia component which at least partly surrounds such a grill component.

Although the displacement of the grille portion 2 can be achieved by any means which is able to force the grille portion 2 in the forward direction 8 during impact when the bonnet portion 3 is exerted to a vertical force, the leading edge 4 of the bonnet portion 3 and the upper edge 6 of the grille portion 2 preferably form an interface for causing the displacement of the grille portion 2 in the forward direction 8 during impact. The leading edge 4 of the bonnet portion 3 and the upper edge 6 of the grille portion 2 preferably form an interface for causing the movement of the grille portion 2 when the bonnet portion 3 transmits a vertically directed force to the grille portion 2. An example of such an interface 12 is schematically illustrated in FIG. 2a.

Figure 2A:
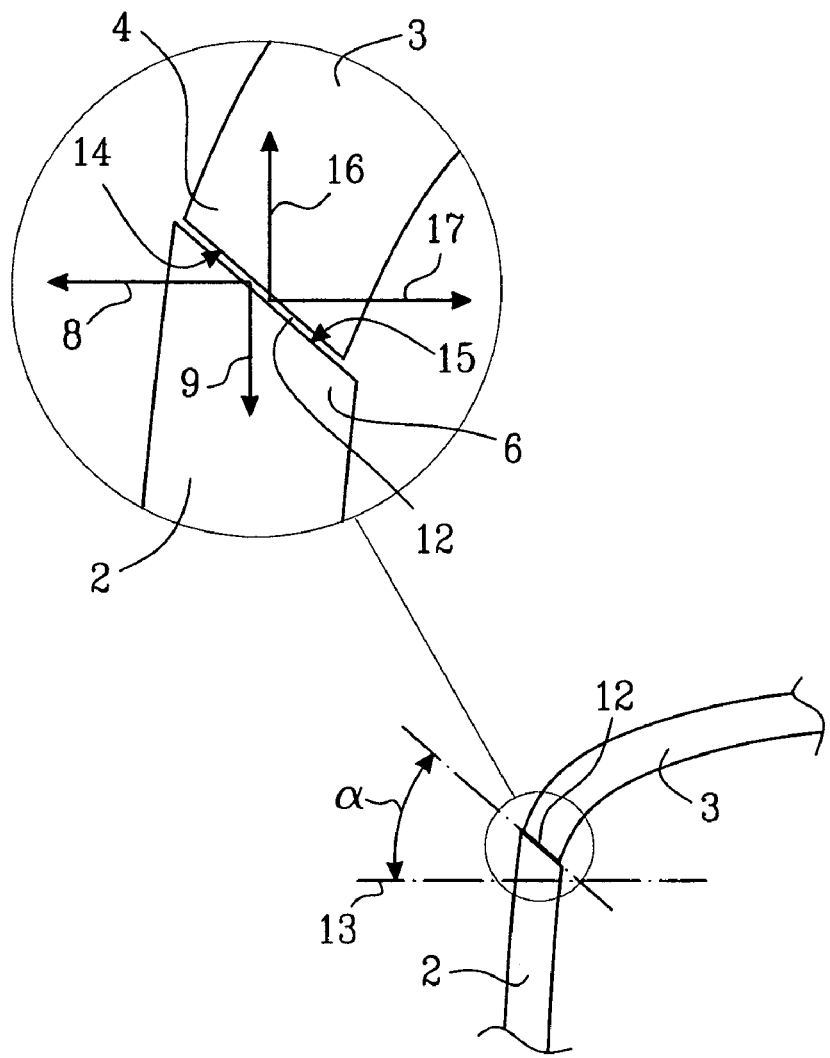
FIG. 2a is an enlarged schematic elevational view illustrating the interface between a grille portion and a bonnet portion of a grille and bonnet assembly, including an enlarged detail elevational view of the interface surfaces, according to the principles of the instant invention.

In FIG. 2a, the interface 12 is angled relative to a horizontal plane 13 such that said interface 12 inclines in the fore-and-aft direction of a vehicle when the assembly is installed for use in the vehicle. In the illustrated example, the leading edge 4 of the bonnet portion 3 has a surface 14 directed downwardly 9 and forwardly 8, and the upper edge 6 of the grille portion 2 has a surface 15 directed upwardly 16 and rearwardly 17. The leading edge 4 of the bonnet portion 3 and the upper edge 6 of the grille portion 2 are arranged to contact each other and slide relative to each other during impact. A vertical force which exerts on the bonnet portion 3 and which force is transmitted to the grille portion 2 will result in a horizontal force component which exerts on the grille portion 2 and pushes the grille portion 2 in the forward direction 8, thereby allowing the bonnet portion 3 to move downwardly with reduced resistance caused by the grille portion 2.

The angled interface 12 can form an angle α in the interval 10-80° relative to the horizontal plane 13, preferably in the interval 20-50°, and more preferably the angle α between the angled interface 12 and the horizontal plane 13 is substantially 30°.

Figure 2B:
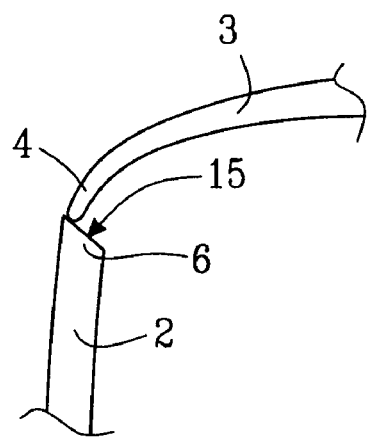
FIG. 2b is an enlarged schematic elevational view similar to that of FIG. 2a but illustrating an alternative embodiment of the grille and bonnet assembly.

FIG. 2b illustrates an alternative embodiment of the grille and bonnet assembly according to the invention. In this embodiment the upper edge 6 of the grille portion 2 has a inclined surface 15 directed upwardly and rearwardly, whereas the leading edge 4 of the bonnet portion 3 has a rounded shape which reduces the contact surface between the leading edge 4 of the bonnet portion 3 and the upper edge 6 of the grille portion 2.

Figure 3A:
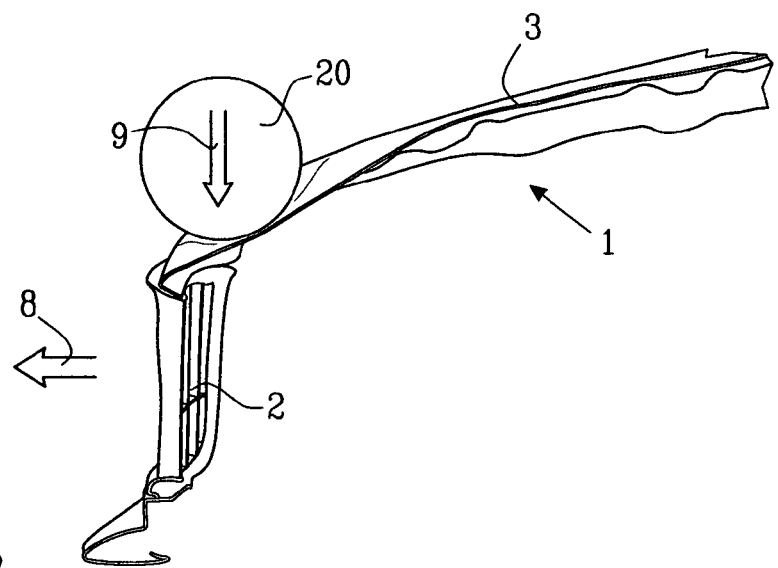
FIG. 3a is an elevational view illustrating the grille and bonnet assembly in FIG. 1 during an initial state of an impact between an object, such as a pedestrian, and the bonnet.
Figure 3B:
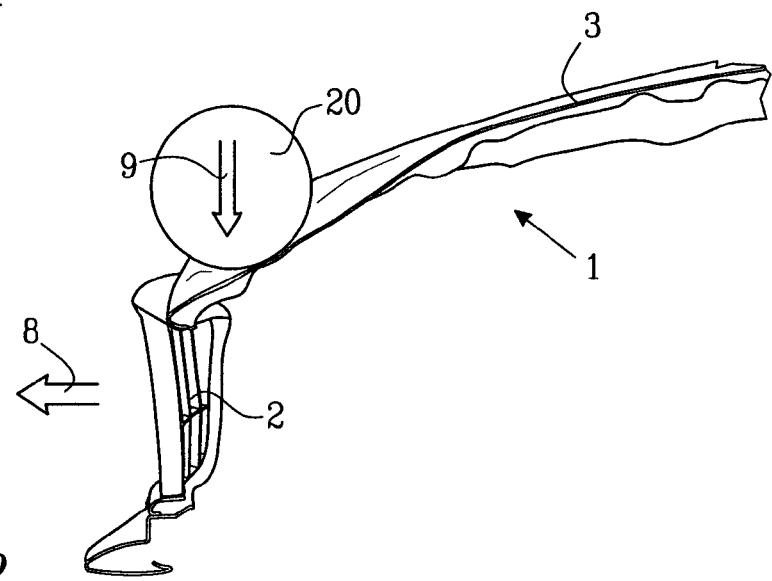
FIG. 3b is an elevational view similar to that of FIG. 3a, but depicting the grille and bonnet assembly when the grille portion is further displaced in the forward direction.
Figure 3C:
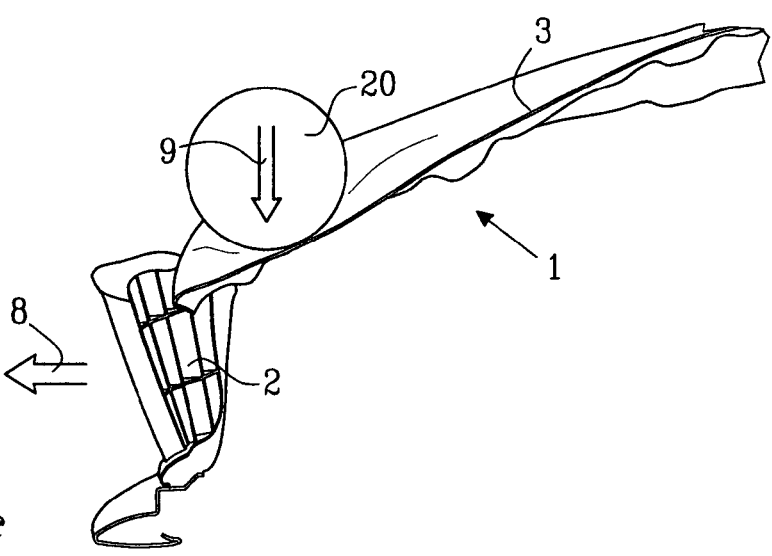
FIG. 3c is an elevational view similar to that of FIG. 3b, but depicting the grille and bonnet assembly at a relatively late state of the impact with the grille moved forward substantially to allow the downward vertical movement of the bonnet.

The impact course is illustrated in FIGS. 3a, 3b and 3c. FIG. 3a is a perspective view illustrating the grille and bonnet assembly 1 in FIG. 1 during an initial state of the impact between a simulated head 20 of a pedestrian and the bonnet portion 3. The grille portion 2 is exerted by a force from the bonnet portion 3 and is started to move in a forward direction 8. FIG. 3b is an illustration corresponding to FIG. 3a illustrating the vehicle bonnet assembly 1 when the grille portion 2 is further displaced in the forward direction 8, and FIG. 3c is an illustration corresponding to FIGS. 3a and 3b illustrating the vehicle bonnet assembly 1 when the grille portion 2 has been displaced forwardly to a position where the grille portion 2 and the bonnet portion 3 are not longer in contact to each other.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a grille and bonnet assembly for a vehicle having a grille portion and a bonnet portion, the bonnet portion having a leading edge and a trailing edge with the leading edge being positioned adjacent an upper edge of the grille portion during normal operation when the bonnet is closed, the improvement comprising:

the grille portion and the bonnet portion are designed and located relative to each other such that above a predetermined value representative of a force to be transmitted from the bonnet portion to the grille portion, the bonnet portion is arranged to force at least the upper part of the grille portion to move forwardly so as to allow the bonnet portion to move downwardly in case of an impact between a pedestrian and the bonnet portion.

2. The grille and bonnet assembly of claim 1 wherein the leading edge of the bonnet portion and the upper edge of the grille portion form an interface for causing the movement of the grille portion in the forward direction during impact.

3. The grille and bonnet assembly of claim 2 wherein said interface is angled relative to a horizontal plane such that said interface inclines in the fore-and-aft direction of a vehicle when the assembly is installed for use in the vehicle.

4. The grille and bonnet assembly of claim 3 wherein the upper edge of the grille portion has an inclined surface directed upwardly and rearwardly.

5. The grille and bonnet assembly of claim 4 wherein the leading edge of the bonnet portion has an inclined surface directed downwardly and forwardly.

6. The grille and bonnet assembly of claim 4 wherein the leading edge of the bonnet portion is a rounded so as to bear on the inclined surface of the upper edge of said grille portion.

7. The grille and bonnet assembly of claim 3 wherein the leading edge of the bonnet portion and the upper edge of the grille portion are arranged to contact each other and slide relative to each other during impact.

8. The grille and bonnet assembly of claim 3 wherein said angled interface forms an angle in the interval 10-80° relative to the horizontal plane.

9. The grille and bonnet assembly of claim 3 wherein said angled interface forms an angle in the interval 20-50° relative to the horizontal plane.

10. The grille and bonnet assembly of claim 3 wherein said angled interface forms an angle substantially equal to 30° relative to the horizontal plane.

11. A grille and bonnet assembly for an automotive vehicle, comprising:

a grille portion having an upper edge formed with a first interface surface; and a bonnet portion having a leading edge and a trailing edge with the leading edge being positioned adjacent said upper edge of the grille portion during normal operation when the bonnet is closed, said leading edge being formed with a second interface surface engagable with the first interface surface on said grille portion, said first interface surface of the grille portion and said second interface surface of the bonnet portion being designed and located relative to each other such that a force above a predetermined value transmitted from the bonnet portion to the grille portion forces at least said upper edge of the grille portion to move forwardly so as to allow the bonnet portion to move downwardly in the event of an impact between an object and the bonnet portion.

12. The grille and bonnet assembly of claim 11 wherein said first interface surface is angled relative to a horizontal plane such that said first interface surface is directed upwardly and rearwardly.

13. The grille and bonnet assembly of claim 12 wherein said second interface surface of the bonnet portion has an inclined surface directed downwardly and forwardly to mate against said first interface surface of said grille portion.

14. The grille and bonnet assembly of claim 12 wherein the leading edge of the bonnet portion is a rounded so as to bear on the first interface surface on the upper edge of said grille portion.

15. The grille and bonnet assembly of claim 12 wherein the leading edge of the bonnet portion and the upper edge of the grille portion are arranged to contact each other and slide relative to each other during impact.

16. The grille and bonnet assembly of claim 12 wherein said first interface surface forms an angle in the range of 20-50° relative to the horizontal plane.

17. In a grille and bonnet assembly for an automotive vehicle, having a grille portion having an upper edge and a bonnet portion having a leading edge and a trailing edge with the leading edge being positioned adjacent said upper edge of the grille portion during normal operation when the bonnet is closed, the improvement comprising:

said upper edge of said grille portion being formed with an inclined surface directed upwardly and rearwardly for engagement with said leading edge of said bonnet portion such that said upper edge of said grille portion is moved forwardly when said leading edge of said bonnet portion is moved downwardly into engagement with said upper edge of said grille portion in response to a force greater than a predetermined value transmitted from the bonnet portion to the grille portion due to an impact between an object and the bonnet portion.

18. The grille and bonnet assembly of claim 17 wherein the leading edge of the bonnet portion and the upper edge of the grille portion are arranged to contact each other and slide relative to each other during impact.

19. The grille and bonnet assembly of claim 18 wherein the leading edge of the bonnet portion is formed with an inclined surface directed downwardly and forwardly for engagement with said inclined surface of said upper edge of the grille portion.

20. The grille and bonnet assembly of claim 18 wherein the leading edge of the bonnet portion is a rounded so as to bear on the inclined surface of the upper edge of said grille portion.

* * * * *